March 10, 1959   G. HOPPE ET AL   2,877,395
DRY RECTIFIER AND METHOD FOR ITS MANUFACTURE
Filed March 21, 1956
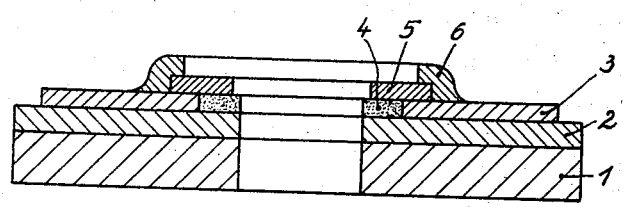
Inventors:
Georg Hoppe
Ernst Siebert
&
Erich Waldkötter

United States Patent Office 2,877,395
Patented Mar. 10, 1959

2,877,395

DRY RECTIFIER AND METHOD FOR ITS MANUFACTURE

Georg Hoppe, Ernst Siebert, and Erich Waldkötter, Berlin-Siemensstadt, Germany, assignors to Siemens-Schuckertwerke Aktiengesellschaft, Berlin-Siemensstadt and Erlangen, Germany, a German corporation Application March 21, 1956, Serial No. 573,000

Claims priority, application Germany March 28, 1955

12 Claims. (Cl. 317—234)

Our invention relates to dry rectifiers, for instance selenium rectifiers, which are formed of individual disc-shaped units and are placed under pressure, for instance, by a bolt that traverses a stack of such units. The contact pressure or other mechanical stress imposed upon the dry rectifier unit during operation, or when mounting the unit or when assembling it together with other units to a stack, may cause damage at the most highly stressed places of the unit. It has become known, therefore, to provide such units with a protective insulating insert at the places thus subject to pressure, and it has also been proposed to use a varnish coating for such purposes.

Generally, however, such rectifiers involve the difficulty that the varnish coating, located beneath a terminal electrode of the unit, may evolve gases during the thermal formation treatment to which such rectifiers must be subjected; and the gas then causes lifting or peeling of the terminal electrode. Similar trouble is encountered with insertions of other insulating materials.

It is an object of our invention to obviate such deficiencies resulting from evolution of gases due to heating of the insulating layer.

To this end, we cover the semiconductor layer on top of the rectifier base electrode with an insulating layer, for instance a varnish coating, at the place subsequently subjected to mechanical pressure, and we dispose on the remaining surface of the semiconductor material a first metal layer to form the cover-electrode of the rectifier unit; we further dispose a porous body of electrode metal onto the insulating layer and in overlapping relation to the adjacent area of the cover-electrode layer, and we then combine the porous body, which forms a terminal electrode, with the cover-electrode layer by alloying. Thus the two metal layers are fused or soldered together into a single electrode structure. In a rectifier thus built up, the gassing of the insulating substance during the subsequent thermal formation process is not detrimental and does not cause peeling of the electrodes, as the evolving gas can escape through and along the porous portion of the electrode structure.

These and more specific features of the invention will be further described below with reference to an example of a selenium rectifier unit made according to the invention and shown in cross section on the accompanying drawing.

The illustrated rectifier unit comprises a base plate 1, made, for instance, of iron or aluminum. The base 1 and all other components of the unit are ring shaped, the central opening being available for the passage of a pressure or mounting bolt. The base 1 is coated with a selenium layer 2 and forms a non-rectifying junction therewith. A major portion of the selenium layer along the outer periphery is contacted by a cover-electrode 3 consisting for instance of a eutectic tin-cadmium alloy. The remaining marginal surface area of the selenium layer 2 along the inner periphery is covered by a protective layer 4 of insulating substance, such as varnish.

The insulating layer 4 is covered by a porous body 5 consisting, for instance of a layer of tin which, for stability, may contain a slight addition of cadmium. The layer 5 forms a terminal electrode and is fused together with the cover-electrode layer 3. If desired, and as shown, a third metal layer 6 may be added. This layer overlaps the layers 3 and 5. It consists preferably of the same metal as the cover-electrode 3 and is fused together with both metal layers 5 and 3.

Generally, the porous metal layer or terminal electrode 5 is preferably deposited by spraying atomized metal onto the semiconductor layer. The fusion or soldering together of cover-electrode and porous terminal electrode is best effected by heating the assembled unit to the fusion temperature so as to cause the adjacent metal layers to form an alloy with each other. The materials of the terminal electrode and of the cover electrode are to be chosen accordingly. That is, these metals must have a melting point such that the assembly can be heated to the temperature required for good alloy formation at the mutually contacting boundary faces of the two metal bodies without detrimentally affecting the semiconductor layer. Furthermore, the melting point of at least the metal that forms the terminal electrode metal must be higher than the heat-processing temperature to which the rectifier unit must be subjected after depositing the terminal electrode. Such heat processing includes the heat treatment by means of which an alloy is produced between the mutually contacting faces of the two metal bodies, and also the tempering processes which are required for converting the semiconductor layer into the proper crystalline modification and which are effected preferably after the cover electrode and the terminal electrode are deposited. In this manner no change is caused relative to the shape and consistency of the terminal electrode when carrying out the step of alloy formation between the cover electrode and terminal electrode, and when ultimately converting the semiconductor layer, so that this terminal electrode remains permeable and porous as desired for the purpose of the invention. However, it is preferable if the cover-electrode proper, during the formation process to which the rectifier unit is subsequently subjected, is heated to the melting point as is often done for other reasons in the manufacture of selenium rectifiers. This melting process, when used in conjunction with the present invention, has the favorable result that it promotes the desired formation of an alloy and thus secures a reliable fusion junction of mechanical as well as electrical excellence between terminal electrode and cover-electrode.

According to the invention, the insulating layer for the prevention of detrimental pressure effects may be disposed on a centrally located area within the plane of the rectifier unit as shown, or it may be located along the outer marginal zone of the rectifier unit, or both arrangements may be used simultaneously if corresponding mechanical stresses occur in the rectifier unit, depending upon the mounting of the unit or its particular use when in operation. In each case, any gas bubbles evolving from the insulating material can escape through the porous terminal electrode or also to some extent along the terminal electrode surface adjacent to the insulating layer.

As has been indicated above, the invention is applicable in cases where the ultimate formation treatment of the semiconductor layer takes place subsequent to depositing the cover-electrode onto the layer. However, the invention also permits applying the semiconductor formation treatment prior to depositing the cover-electrode. In either case the melting points of the electrode metals are to be chosen appropriately, so that a good fusion by alloying or soldering is secured without impairing the semiconductor layer. The electrode layers are preferably deposited by spraying of atomized metal. In this manner a good mutual adaptation of the two electrode bodies (3, 5) at the contacting surface is secured because the subsequently deposited metal layer cannot but match the surface texture of the metal layer previously deposited. For similar reasons it is also preferable to deposit the insulating layer by spraying to obtain a similar mutual adaptation and interlocking surface texture of the adjacent bodies.

For further elucidating the invention an example of a manufacturing method will now be described with reference to the illustrated embodiment of a selenium rectifier.

First, the semiconducting layer 2 of selenium is deposited upon the surface of the base or carrier plate 1 of iron or aluminum. The selenium may be deposited in any known manner, for instance by vaporization. During deposition, or as a result thereof, the selenium layer may assume a pre-crystalline condition.

When depositing the selenium onto the base, care should be taken to prevent the formation of a barrier layer. For this purpose, the base plate is preferably first provided with a suitable coating, for instance, in the following manner. Before depositing the selenium, the base plate is plated with nickel. Then the nickel plating is superfically converted into nickel selenide. This is done by dusting the nickel-plate base plate uniformly with selenium powder. The dusted plate is then subjected for about five minutes to a temperature of 350° C. and thereafter, again for about five minutes, to a temperature of about 180° C. Thus processed the base plate is provided with the selenium layer, and the transition between nickel-nickel selenide-selenium is free of barrier effects.

After the selenium coating 2 is applied, a stencil is placed upon the surface, and the cover-electrode 3 is deposited by spraying. As mentioned, the material used for the cover-electrode 3 consists preferably of a eutectic alloy of tin and cadmium. Thereafter another stencil is placed upon the surface of the assembly, and the insulating material of layer 4 is spread onto the selenium surface or is deposited by spraying from an atomizer. The material for the insulating layer consists preferably of a heat-resistant varnish in order to secure insensitivity to changes in temperature. Such varnishes are commercially available. A varnish of suitable composition may have the following components: 25% phthalate resin, 26% iron oxide, 15% zinc oxide and 34% solvent consisting of benzene and benzol.

In order to secure an intimate junction between the cover-electrode 3 and the ring-shaped insulating body 4, it is in some cases preferable, although not shown on the drawing, to have the inner edge of the cover-electrode gradually tapering toward the outside, rather than giving this edge a rectangular shape, so that the insulating ring 4 and the cover-electrode body 3 will somewhat overlap each other.

After deposition of the insulating layer, the assembly is subjected to pre-drying, if necessary by supplying heat so that the solvent contained in the insulating layer evaporates to a large extent. Complete drying of the above-analyzed varnish material can be effected by tempering the assembly at a temperature between 140° and 160° C. during a period of about one hour. However, such complete drying of the insulating layer is not absolutely necessary because the rectifier unit, when completely assembled, must anyhow be subjected to heat processing. For that reason, it suffices to dry the varnish layer for about ten minutes in air at normal room temperature (20° C.).

After pre-drying, the terminal electrode body 5 is sprayed onto the assembly with the aid of a suitable stencil. The material of the terminal electrode may consist of tin with a slight addition of cadmium. The complete assembly is then subjected to heat treatment for producing an alloying fusion between bodies 3 and 5 at their mutually contacting faces thus welding them together. As mentioned, this heat processing may be such that it also converts the semiconducting layer 2 into the crystalline modification required for best conductance.

The just mentioned heat processing may be effected at 218° C. for a period of approximately ten minutes. As a result of this treatment, an alloy and fusion between the electrode bodies 3 and 5 is secured as well as a conversion of the selenium layer 2 into the best-conductive modification.

If, as in the illustrated embodiment, the above mentioned components essential for the rectifier unit are supplemented by an additional body 6 in form of another metal layer, this metal layer is likewise deposited by spraying and consists preferably of the same material as the cover-electrode body 3. It is, of course, also desired to have an intimate alloyed fusion junction between bodies 3 and 6. For that reason, it is preferable to apply the body 6 prior to the ultimate formation treatment so that a single heat processing is sufficient for fusing all three metal components of the electrode structure together and for also converting the semiconducting layer into best conductive modification.

We claim:

1. The method of producing a dry rectifier having a conducting base, a cover electrode and a semiconducting layer between base and electrode, which comprises the steps of disposing the semiconducting layer on the base, disposing an insulating substance on a portion of said layer at a location susceptible to strain by compression of the completed rectifier, disposing electrode metal gas on a remaining portion of the semiconducting layer, disposing a gas porous body of metal on the insulating material and in overlapping contact with the deposited electrode metal, and heating the assembly to fusion temperature so as to fuse said electrode metal and said metal body together, the metal of the porous body having a melting point higher than the fusion temperature, whereby it remains gas porous.

2. The method of producing a dry rectifier having a conducting base, a cover electrode and a semiconducting layer between base and electrode, which comprises the steps of coating the base with the semiconducting layer, disposing an insulating substance on a portion of said layer at a location susceptible to strain by compression of the completed rectifier, spraying electrode metal onto a remaining portion of the semiconducting layer to form a first atomized electrode layer, spraying a second layer of electrode metal onto the insulating material and onto an adjacent portion of the first electrode layer to provide a gas porous layer, and heating the assembly to alloying temperature of said two electrode metal layers, the metal of the second layer having a melting point higher than the alloying temperature, whereby it remains gas porous.

3. The method according to claim 1, wherein said porous body of metal is first produced independently of the rest of the rectifier and its then placed onto said insulating material and said electrode metal.

4. The method of producing a dry rectifier having a conducting base, a cover electrode and a semiconducting layer between base and electrode, which comprises the steps of coating the base with the semiconducting layer, disposing an insulating substance on said layer at a location susceptible to strain by compression of the completed rectifier, depositing electrode metal onto a remaining portion of the semiconducting layer, depositing a gas porous body of metal onto the insulating material and in overlapping contact with the deposited electrode metal, depositing another layer of electrode metal onto the peripheral marginal portion of said porous body in overlapping relation to the adjacent surface of the first-deposited electrode metal, and heating the assembly to alloy and fuse the three metal deposits into one integral electrode body, the metal of the porous body having a melting point higher than the fusion temperature, whereby it remains gas porous.

5. The method of producing a dry rectifier having a conducting base, a cover-electrode and a semiconducting layer between base and electrode, which comprises the steps of coating the base with th semi-conducting layer, disposing an insulating substance on said layer at a location susceptible to strain by compression of the completed rectifier, depositing electrode metal onto a remaining portion of the semiconducting layer, depositing a porous body of metal onto the insulating material and in overlapping contact with the deposited electrode metal, and subjecting the assembly to thermal formation treatment for said semiconducting layer at a temperature within the fusion range of said electrode metal and metal body, whereby said semiconducting layer is modified and said metal and body are fused together as the result of said single heating step, the metal of the porous body having a melting point higher than the fusion temperature, whereby it remains gas porous.

6. The method of producing a dry rectifier having a conducting base, a cover-electrode and a semiconducting layer between base and electrode, which comprises the steps of coating the base with the semiconducting layer, depositing a layer of insulating varnish on said semiconducting layer at a location susceptible to stress by compression of the completed rectifier, drying the varnish layer, depositing electrode metal onto a remaining portion of the semiconducting layer, depositing a porous body of metal onto the insulating varnish layer and in overlapping relation to the deposited electrode metal, and applying heat to fuse said electrode metal and said body together, the metal of the porous body having a melting point higher than the fusion temperature, whereby it remains gas porous.

7. A dry rectifier, comprising a flat base electrode of annular shape, a semiconducting coating on said base electrode, a layer of insulating substance covering a marginal portion of said semiconducting coating adjacent the inner periphery of said base electrode, a first annular layer of electrode metal covering a remaining portion of said semiconducting coating adjacent the outer periphery, a second layer of porous electrode metal covering at least part of said insulating layer and overlapping an adjacent surface area of said first layer of electrode metal, a third annular layer of electrode metal on the outer peripheral portion of said second layer and overlapping the adjacent surface area of said first metal layer, said three metal layers forming respective fusion junctions with each other so as to constitute together a single electrode body.

8. The method of producing a dry rectifier having a conducting base, a cover electrode of a eutectic alloy of tin and cadmium and a semiconducting layer of selenium between the base and electrode, which comprises the steps of disposing the semiconducting layer on the base, disposing an insulating substance on a portion of said layer at a location susceptible to strain by compression of the completed rectifier, disposing electrode metal comprising said alloy on a remaining portion of the semiconducting layer, disposing a gas porous body comprising tin on the insulating material and in overlapping contact with the alloy electrode metal, and heating the assembly to fusion temperature so as to join said alloy electrode metal and said porous body together, the porous body having a melting point higher than the fusion temperature, whereby it remains gas porous, the insulating substance being a carbonaceous material which yields gas upon heating.

9. The method of producing a dry rectifier having a conducting base, a cover electrode of an alloy of tin and cadmium and a semiconducting layer of selenium between the base and electrode, which comprises the steps of coating the base with the semiconducting layer, disposing an insulating substance on said semiconducting layer at a location susceptible to strain by compression of the completed rectifier, disposing a first layer of electrode metal comprising said alloy on a remaining portion of the semiconducting layer, disposing a gas porous body comprising tin on the insulating material and in overlapping contact with the alloy electrode metal, disposing another layer of electrode metal on the peripheral marginal portion of said porous body in overlapping relation to the adjacent surface of the first layer of electrode metal, and heating the assembly to alloy and fuse the three metal layers into one integral electrode body, the porous body having a melting point higher than the fusion temperature, whereby it remains gas porous, the insulating substance being a carbonaceous material which yields gas upon heating.

10. The method of producing a dry rectifier having a conducting base, a cover electrode of a eutectic alloy of tin and cadmium and a semiconducting layer of selenium between the base and electrode, which comprises the steps of coating the base with the semiconducting layer, depositing a layer of insulating varnish on said semiconducting layer at a location susceptible to stress by compression of the completed rectifier, drying the varnish layer, depositing electrode metal comprising said alloy onto a remaining portion of the semiconducting layer, depositing a porous body comprising tin onto the insulating varnish layer and in overlapping relation to the deposited electrode metal, and applying heat to fuse said electrode metal and said porous body together, the metal of the porous body having a melting point higher than the fusion temperature, whereby it remains gas porous to permit gases generated by the varnish to escape.

11. The process of claim 5 in which the semiconductor layer is selenium, the electrode metal deposited is a eutectic alloy of tin and cadmium, and the porous body comprises tin.

12. A dry rectifier, comprising a flat base electrode of annular shape, a selenium semiconducting coating on said base electrode, a layer of carbonaceous insulating substance covering a marginal portion of said semiconducting coating adjacent the inner periphery of said base electrode, a first annular layer of electrode metal comprising a tin-cadmium alloy covering a remaining portion of said semiconducting coating adjacent the outer periphery, a second layer of porous electrode metal comprising tin covering at least part of said insulating layer and overlapping an adjacent surface area of said first layer of electrode metal, a third annular layer of electrode metal comprising a tin-cadmium alloy on the outer peripheral portion of said second layer and overlapping the adjacent surface area of said first metal layer, said three metal layers forming respective fusion junctions with each other so as to constitute together a single electrode body, the second layer having a higher melting point than the other two layers.

References Cited in the file of this patent

UNITED STATES PATENTS

| | | |
|---|---|---|
| 2,345,122 | Herrmann | Mar. 28, 1944 |
| 2,517,602 | Richards et al. | Aug. 8, 1950 |
| 2,647,226 | Arvidsson | July 28, 1953 |